(12) United States Patent
Drewes et al.

(10) Patent No.: US 9,071,399 B2
(45) Date of Patent: Jun. 30, 2015

(54) METHOD FOR OPERATING A TRANSCEIVER CIRCUIT AND TRANSCEIVER CIRCUIT

(75) Inventors: Christian Drewes, Germering (DE); Bertram Gunzelmann, Koenigsbrunn (DE); Birgit Breining, Munich (DE); Juergen Kreuchauf, San Francisco, CA (US); Elmar Wagner, Taufkirchen (DE); Hyung-Nam Choi, Hamburg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 213 days.

(21) Appl. No.: 13/597,480

(22) Filed: Aug. 29, 2012

(65) Prior Publication Data

US 2014/0064067 A1   Mar. 6, 2014

(51) Int. Cl.
*H04J 3/06* (2006.01)
*H04L 5/00* (2006.01)

(52) U.S. Cl.
CPC .................. *H04L 5/0044* (2013.01)

(58) Field of Classification Search
USPC .......................................... 370/503–504, 514
See application file for complete search history.

(56) References Cited

U.S. PATENT DOCUMENTS

| 6,937,617 | B2* | 8/2005 | Rakib et al. | 370/485 |
|---|---|---|---|---|
| 7,613,104 | B2* | 11/2009 | Bhatt et al. | 370/208 |
| 7,940,790 | B2* | 5/2011 | Becker et al. | 370/462 |
| 7,961,751 | B2* | 6/2011 | Fourcand | 370/442 |
| 8,428,043 | B2* | 4/2013 | Kishiyama et al. | 370/349 |
| 8,606,280 | B2* | 12/2013 | Lee et al. | 455/450 |
| 8,665,695 | B2* | 3/2014 | Liao et al. | 370/208 |
| 2010/0002675 | A1* | 1/2010 | Fu et al. | 370/343 |
| 2012/0269135 | A1* | 10/2012 | Trachewsky et al. | 370/328 |

FOREIGN PATENT DOCUMENTS

EP   2398202 A2   12/2011

OTHER PUBLICATIONS

RP-111112, SID "Provision of low-cost MTC UEs based on LTE", Vodafone. Nov. 6-10, 2006.
R1 -063599, LS on minimum receiver bandwidth capability, Motorola. Jun. 10, 2006.
R1-071207, LS on UE transmission bandwidth capability, Ericsson. Jan. 12-16, 2007.
3GPP TS 36.211: E-UTRA-Physical channels and modulation. Dec. 2011.
3GPP TS 36.331: E-UTRA Radio Resource Control. Mar. 2012.
European Search Report Dated Dec. 17, 2013 for International Application No. 13181389.1.

* cited by examiner

*Primary Examiner* — Phuc Tran
(74) *Attorney, Agent, or Firm* — Eschweiler & Associates, LLC

(57) ABSTRACT

A method for operating a transceiver circuit includes receiving an information indicating at least one of a transmission and a reception in a guard band region of a frequency band supported by a communications network and allocating at least a part of the guard band region of the supported frequency band of the communications network for at least one of a transmission and a reception of at least one physical channel.

23 Claims, 11 Drawing Sheets

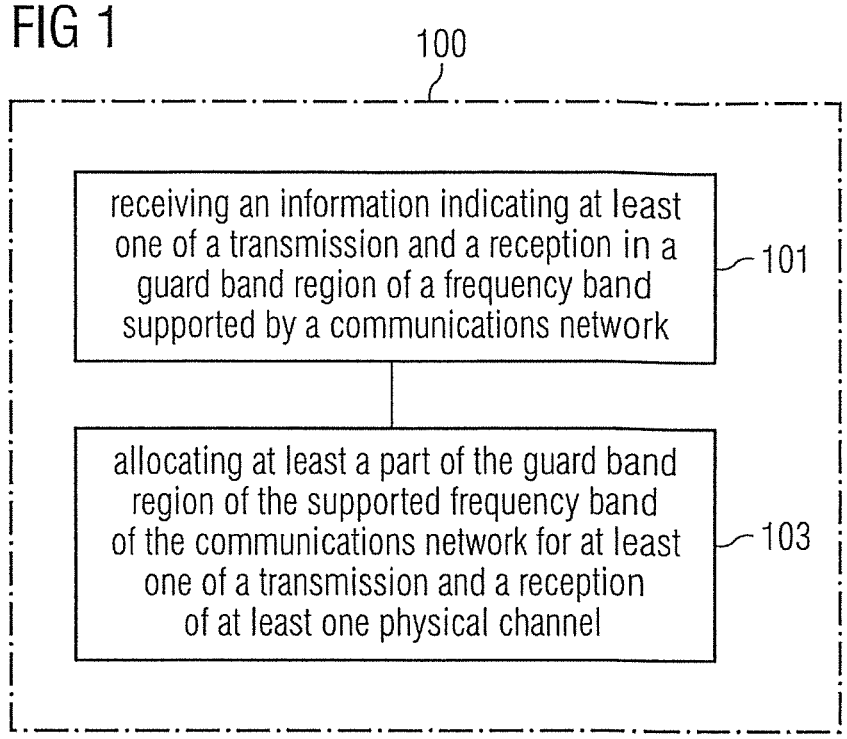
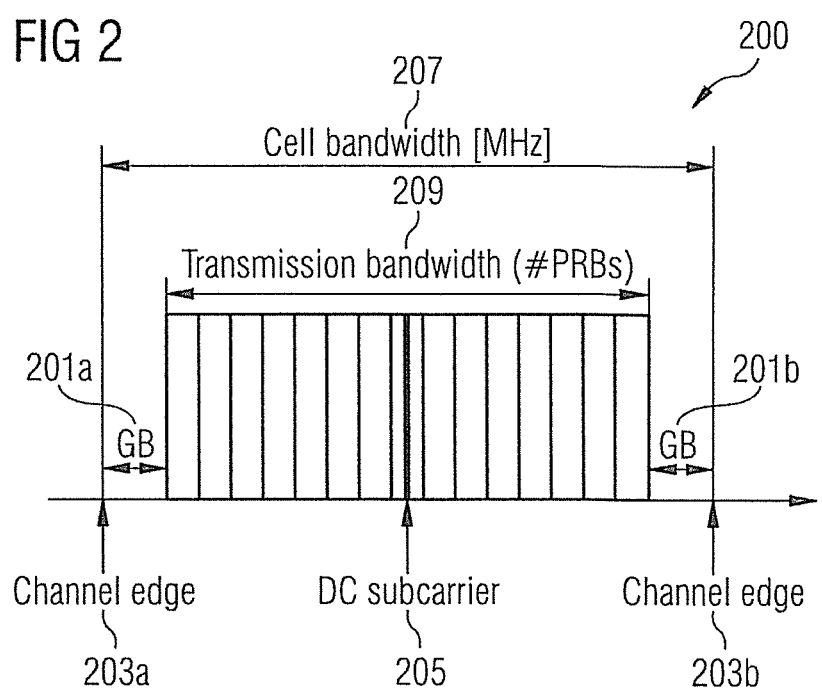

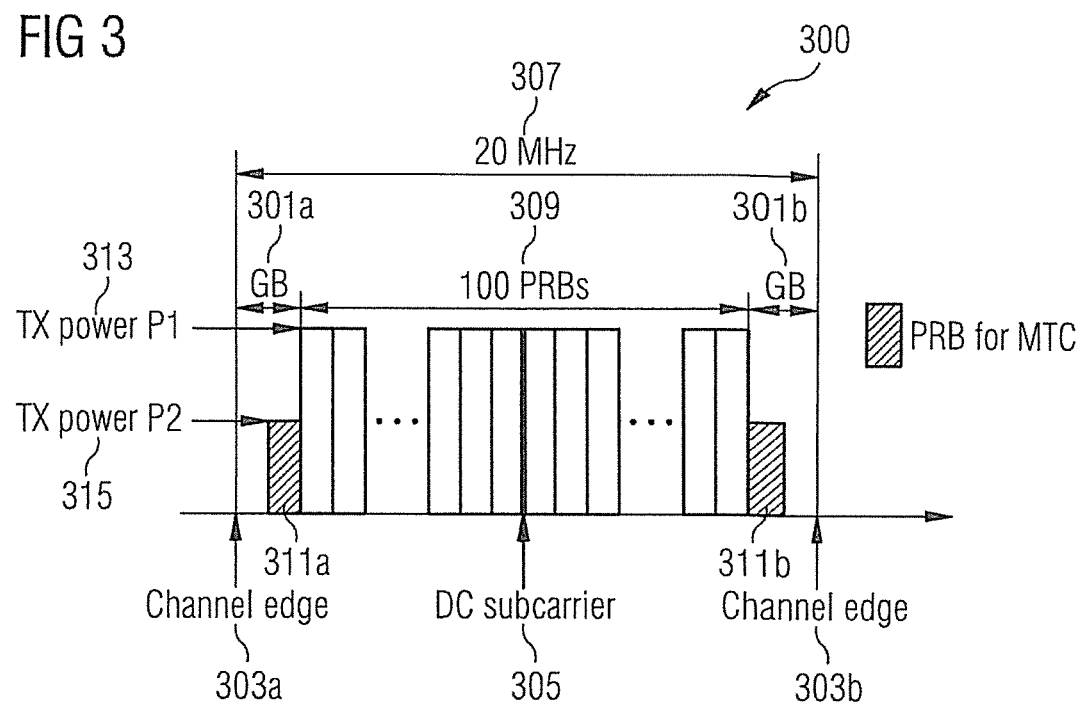

US 9,071,399 B2

METHOD FOR OPERATING A TRANSCEIVER CIRCUIT AND TRANSCEIVER CIRCUIT

FIELD

The invention relates to a method for operating a transceiver circuit in a communications network, in particular in a radio communications network and to a transceiver circuit.

BACKGROUND

MTC (Machine-Type Communications) or M2M (Machine-to-Machine) refers to data communications between machines over mobile networks that do not necessarily need human interaction. Examples of MTC applications include fleet management, remote maintenance and control, and remote diagnostics. Data transmission in communications networks constantly has to be improved. In particular, it may be desirable to provide low-end MTC devices operating at improved data transmission in LTE communications networks without requiring significant changes to the existing LTE standard. For these and further reasons there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

FIG. 1 schematically illustrates a method 100 for operating a transceiver circuit in accordance with the disclosure.

FIG. 2 schematically illustrates a configuration 200 of a frequency band supported by a communications network in accordance with the disclosure.

FIG. 3 schematically illustrates a further configuration 300 of a frequency band supported by a communications network in accordance with the disclosure.

DETAILED DESCRIPTION

In the following detailed description, reference is made to the accompanying drawings, which form a part thereof, and in which is shown by way of illustration specific embodiments in which the disclosure may be practiced. It is understood that other embodiments may be utilized and structural or logical changes may be made without departing from the scope of the disclosure. The following detailed description, therefore, is not to be taken in a limiting sense, and the scope of the disclosure is defined by the appended claims.

While a particular feature or aspect of an embodiment of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the disclosure may be implemented in discrete circuits, partially integrated circuits or fully integrated circuits or programming means. Also, the terms "exemplary", "for example" and "e.g." are merely meant as an example, rather than the best or optimal.

Throughout this specification, the following terms, abbreviations and notations will be used:
AC: Access class,
3GPP: Third Generation Partnership Project,
DL: Downlink,
DC: Direct current, refers to a constant, zero frequency signal component,
DC sub-carrier: is the sub-carrier whose frequency is equal to the center carrier frequency,
DM: Device Management,
EAB: Extended Access Barring,
eNB: eNodeB—Base transceiver station in LTE,
EPC: Evolved Packet Core,
FDD: Frequency Division Duplex,
LTE: Long Term Evolution,
MTC: Machine-Type Communications,
M2M: Machine-to-Machine,
OFDMA: Orthogonal Frequency Division Multiple Access,
OMA: Open Mobile Alliance,
OTA: Over The Air
PBCH: Physical Broadcast Channel,
PCFICH: Physical Control Format Indicator Channel,
PDCCH: Physical Downlink Control Channel,
PDSCH: Physical Downlink Shared Channel,
PHICH: Physical Hybrid ARQ Indicator Channel,
PHY: Physical layer,
PRACH: Physical Random Access Channel,
PRB: Physical Resource Block,
PUCCH: Physical Uplink Control Channel,
PUSCH: Physical Uplink Shared Channel,
RAN: Radio Access Network,
RE: Resource Element,
RF: Radio Frequency,
RRC: Radio Resource Control,
RX: Reception,
SC-FDMA: Single Carrier Frequency Division Multiple Access,
SIB: System Information Block, SIM: Subscriber Identity Module,
TDD: Time Division Duplex,
TDMA: Time Division Multiple Access,
TX: Transmission,
UE: User Equipment,
UL: Uplink,
UMTS: Universal Mobile Telecommunications System,
USIM: Universal Subscriber Identity Module.

Figure 12:
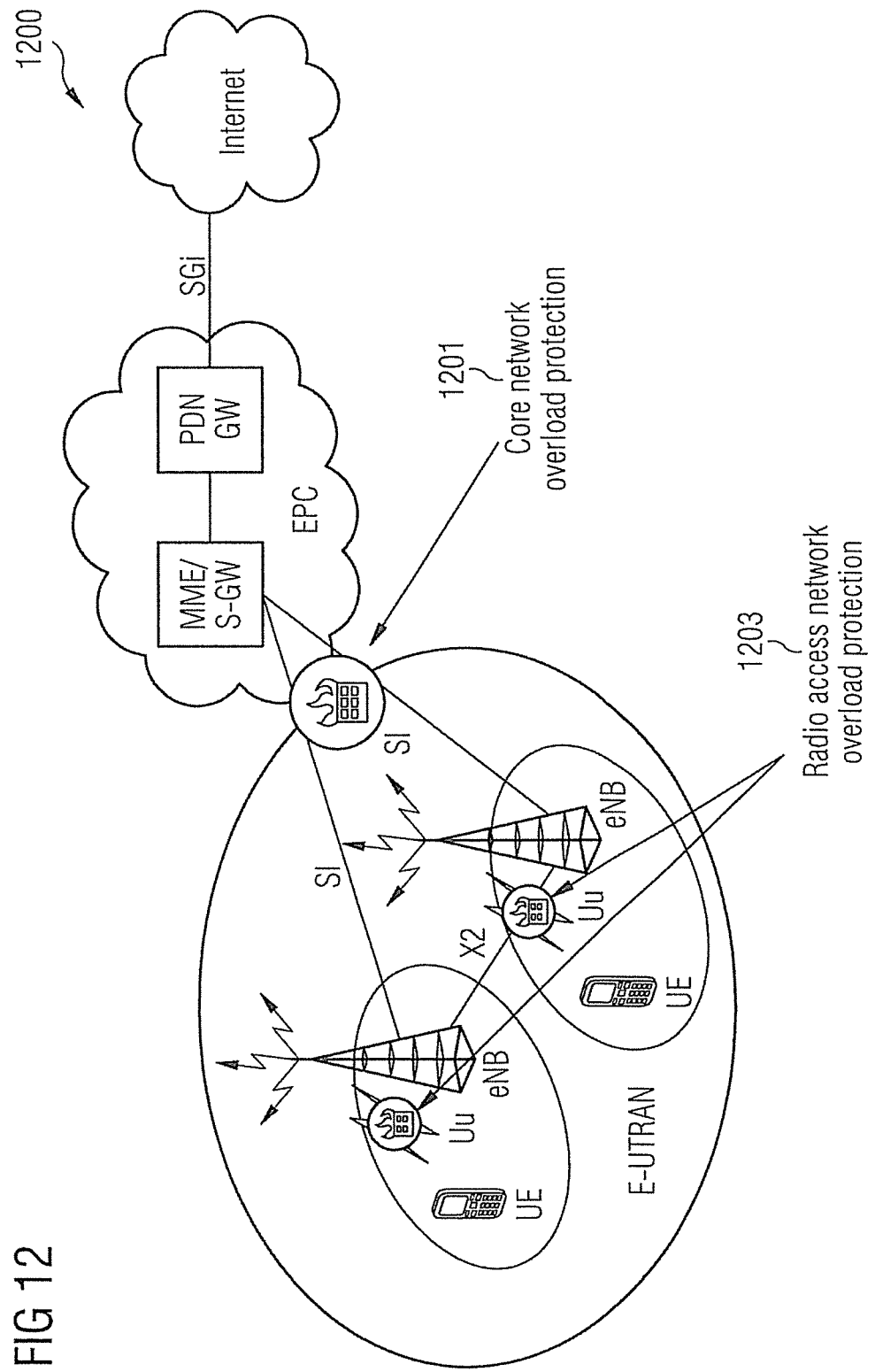
FIG. 12 schematically illustrates a block diagram of an LTE network 1200 applying overload protection mechanisms.

The methods and devices described herein may utilize standards like e.g. MTC, UMTS, LTE, etc. E.g. 3GPP (Third Generation Partnership Project) supports MTC in Release 10 and Release 11 of UMTS (Universal Mobile Telecommunications System) and LTE (Long Term Evolution) with focus on overload protection of the radio access network and the core network as the network may face increased load as well as possible surges of MTC traffic due to the fact that a large number of MTC devices may be deployed in a specific area. As an example in FIG. 12 supported overload protection mechanisms 1200 for LTE are illustrated.

In order to protect the core network from signaling congestion and overload, the MTC UE (User Equipment) may be configured for "delay tolerant access" per subscription by agreement with the operator or reconfigurable with OMA (Open Mobile Alliance) DM (Device Management) or (U)SIM (Universal)(Subscriber Identity Module) OTA (Over The Air) procedures. When the MTC UE is configured for such "delay tolerant access", it may send a "delay tolerant" indicator to the NW (Network) as establishment cause in RRC (Radio Resource Control) Connection Request message to indicate that it can tolerate longer delays in connection establishment. Depending on the core network load it may be up to the network to decide whether to accept or to reject an RRC Connection Request message received from the MTC UE. If the network signals RRC connection reject message to the MTC UE with an extended wait time value, i.e. a value range between 1 and 1800 sec, then the MTC UE may restart RRC connection establishment procedure after expiry of the timer.

In order to further protect the radio access network from signaling congestion and overload, the access attempts from low priority MTC UEs may be controlled via EAB (Extended Access Barring) if they are configured to do so. Access control via EAB may be based on a selective barring of the Access Classes 0-9 allocated to MTC UEs, i.e. if a certain AC (Access Class) is temporarily barred, e.g. AC 0, then all MTC UEs allocated with AC 0 may be not allowed to access the cell, i.e. not to send an RRC Connection Request message to the network. An MTC UE may be configured for EAB per subscription by agreement with the operator or reconfigurable with OMA DM (Device Management) or (U)SIM OTA procedures.

LTE may support scaleable bandwidths of [1.4, 3, 5, 10, 15, 20] MHz based on new multiple access methods, i.e. OFDMA/TDMA in downlink and SC-FDMA/TDMA in uplink. Irrespective of the frequency bands supported by the UE, the minimum RF capability of an LTE UE for transmission and reception may be set to 20 MHz. The decision on such minimum RF capability may provide a bandwidth agnostic physical layer design and operation.

Due to a unique minimum RF capability of an LTE UE it may be impossible to operate a low-cost, low-band MTC UE, i.e. an MTC UE supporting bandwidth sizes of e.g. 1.4, 3 or 5 MHz only, in a cell of 10, 15 or 20 MHz bandwidth size without significant changes of the bandwidth agnostic physical layer design and operation.

In LTE the following types of duplexing methods may be supported: full-duplex FDD, half-duplex FDD and TDD. Full-duplex FDD may use two separate frequency bands for uplink and downlink transmissions wherein both transmissions may occur simultaneously. Half-duplex FDD also uses two separate frequency bands for uplink and downlink transmissions, but both transmissions may be non-overlapping in time. TDD may use the same frequency band for transmission in both uplink and downlink. Within a time frame the direction of transmission is switched alternatively between downlink and uplink.

Figure 13:
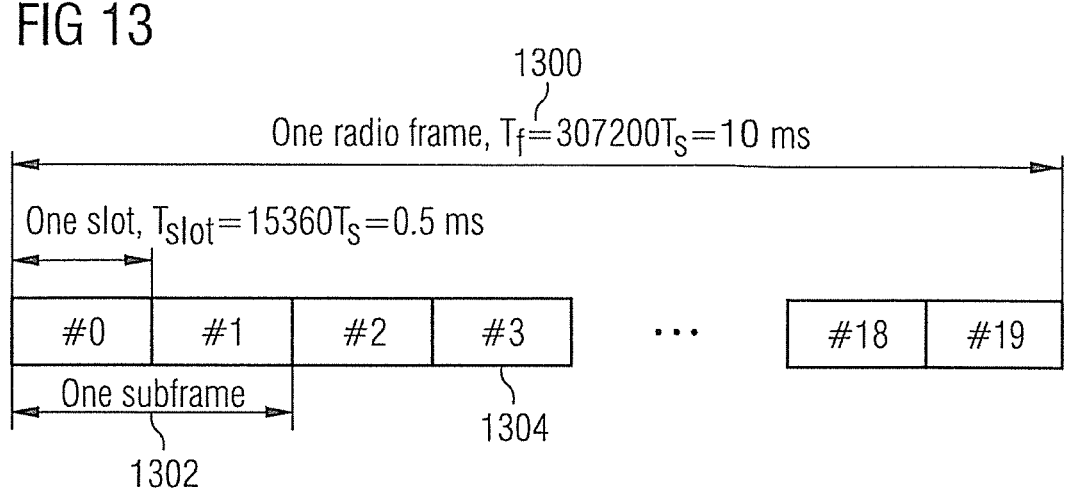
FIG. 13 schematically illustrates a radio frame 1300 of an LTE communications network.

A frame structure type as shown in FIG. 13 is applicable to full-duplex and half-duplex FDD. Each radio frame 1300 is 10 ms long and consists of 20 slots 1304 of length 0.5 ms, numbered from 0 to 19. A sub-frame 1302 is defined as two consecutive slots 1304. In each 10 ms interval, 10 sub-frames 1302 are available for downlink transmissions and 10 sub-frames 1302 are available for uplink transmissions. Uplink and downlink transmissions are separated in the frequency domain. Depending on the slot format, a sub-frame 1302 consists of 14 or 12 OFDMA symbols in DL and 14 or 12 SC-FDMA symbols in UL, respectively. It is noted that details of frame structures and timings are e.g. described in 3GPP TS 36.211 "E-UTRA—Physical channels and modulation".

In the following, transceiver circuits and methods for operating transceiver circuits are described separately or with reference to each other. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary embodiments described herein may be combined with each other, unless specifically noted otherwise.

For a better understanding of the disclosure, various terms are specified in the following.

A transceiver may be a device including both a transmitter and a receiver which may be combined and may share common circuitry or a single housing. When no circuitry is common between transmit and receive functions, the device is a transmitter-receiver. Transceivers may combine a significant amount of the transmitter and receiver handling circuitry. Similar devices may include transponders, transverters, and repeaters.

A transceiver circuit may be a transceiver implemented on a circuit, e.g. an electronic or optical circuit. The circuit may be implemented on a chip or on a chip package or it may be implemented within a chip or chip package on a printed circuit board (PCB).

An RF transceiver may use RF modules for high speed data transmission. Micro-electronic circuits in the digital-RF architecture may work at speeds up to 100 GHz. The objective in the design is to bring the digital domain closer to the antenna, both at receive and transmit ends using software defined radio (SDR). The software-programmable digital processors used in the circuits permit conversion between digital baseband signals and analog RF. A transceiver circuit as described in the following may include such a transceiver.

On a wired telephone, the handset may contain the transmitter and receiver for the audio. The whole unit may be referred to as a "receiver". On a mobile telephone or other radiotelephone, the entire unit may be a transceiver, for both audio and radio. A transceiver circuit as described in the following may include such a transceiver.

A cordless telephone may use an audio and radio transceiver for the handset and a radio transceiver for the base station. If a speakerphone is included in a wired telephone base or in a cordless base station, the base becomes an audio transceiver in addition to the handset. A transceiver circuit as described in the following may include such a transceiver.

A modem may be similar to a transceiver, in that it sends and receives a signal, but a modem may use modulation and demodulation. The modem may modulate a signal being transmitted and may demodulate a signal being received. A transceiver circuit as described in the following may include a modem.

In Ethernet networks, transceivers may be called Medium Attachment Units (MAUs) in IEEE 802.3 documents and were widely used in 10BASE2 and 10BASE5 Ethernet networks. Fiber-optic gigabit and 10 Gigabit Ethernet may utilize transceivers known as GBIC, SFP, SFP+, XFP, and XAUI. A transceiver circuit as described in the following may include such a transceiver.

In the following, communications networks, frequency bands supported by communications networks and guard band regions of such frequency bands are described separately or with reference to each other.

A communications network may include a telecommunications network or a computer network or another network for providing communication. A telecommunications network may be a collection of terminals, links and nodes enabling telecommunication between users of the terminals. Networks may use circuit switching or message switching. Each terminal in the network may have a unique address such that messages or connections can be routed to the correct recipients. The collection of addresses in the network may be designated as the address space. The links may connect the nodes and may be built upon an underlying transmission network which physically drives the message across the link.

A telephone network is a telecommunications network used for telephone calls between two or more subscribers. There are a number of different types of telephone networks, e.g. a fixed line network where the telephones are directly wired into a single telephone exchange. Such fixed network is known as the public switched telephone network (PSTN). A wireless network is a communications network in which the telephones may be mobile and may move within a coverage area. A private network is a communications network in which a closed group of telephones may be connected to each other. A gateway may be used to reach the outside world. This may be called a private branch exchange (PBX).

A computer network is a collection of computers and further hardware components that are interconnected by communication channels for sharing information and resources. Two devices are said to be in a network where at least one process in one device is able to send and/or receive data to/from at least one process in a remote device. A computer network may be an interconnection of more than one device interchanging information through a communications medium.

A frequency band supported by a communications networks is a part of the available frequency spectrum, e.g. a radio spectrum or a wired-line spectrum that may have been configured by a network operator for usage in data transmission applications.

The term "radio spectrum" may refer to the part of the electromagnetic spectrum corresponding to radio frequencies, i.e. frequencies lower than around 300 GHz. Different parts of the radio spectrum may be used for different radio transmission technologies and applications. Ranges of allocated frequencies, i.e. frequency bands supported by the radio communications network, may be referred to by their provisioned use, for example cellular spectrum or television spectrum.

A guard band is an unused part of the frequency spectrum between frequency bands, for the purpose of preventing interference. A guard band may be a narrow frequency range that may be used to separate two wider frequency ranges to ensure that both can transmit simultaneously without interfering each other. A guard band may be used in frequency division multiplexing. A guard band may be used in both, wired or wireless communications such that adjacent frequency bands on the same media can avoid interference. Guard bands may be used in OFDM based networks and may provide a required separation of frequency bands.

In the following, MTC and M2M devices are described. Machine type communication may be a form of data communication which may involve one or more entities that do not necessarily need human interaction. A service optimized for machine type communications may differ from a service optimized for Human to Human communications. Machine type communications may be different than current mobile network communication services as it involves different market scenarios, data communications, lower costs and effort, a potentially very large number of communicating terminals with, to a large extent, little traffic per terminal.

An MTC device may be a UE equipped for Machine Type Communication which communicates through a PLMN with MTC Server(s) and/or other MTC Device(s). An MTC Device may also communicate locally (wirelessly, possibly through a PAN, or hardwired) with other entities that provide the MTC Device "raw data" for processing and communication to the MTC Server(s) and/or other MTC Device(s). MTC Features may be network functions to optimize the network for use by M2M (Machine-to-Machine) applications. An MTC Group may be a group of MTC Devices that share one or more MTC Features and that belong to the same MTC Subscriber. An MTC Server may be a server which communicates to the PLMN itself as well as to MTC Devices through the PLMN. The MTC Server also may have an interface which may be accessed by the MTC User. The MTC Server may perform services for the MTC User.

An MTC User may use the service provided by the MTC Server. An MTC Subscriber may be a legal entity having a contractual relationship with the network operator to provide service to one or more MTC Devices. Typically an M2M service provider may be the party holding subscriptions in order to provide connectivity between MTC Devices and the MTC Server. In practice, certain roles may collapse, e.g. the network operator may act as the same time as Service Provider.

It is noted that an MTC device may be a device according to the standard 3GPP TS 22.368, in particular version V11.5.0 (2012-06) or higher.

In the following, physical channels, physical resource blocks and system information blocks are described separately or with reference to each other.

In telecommunications and computer networking, a physical communication channel or physical channel may refer either to a physical transmission medium such as a wire or to a logical connection over a multiplexed medium such as a radio channel. A channel may be used to convey an information signal, for example a digital bit stream, from one or several senders (or transmitters) to one or several receivers. A channel has a certain capacity for transmitting information, often measured by its bandwidth in Hz or its data rate in bits per second.

In an LTE communications network, the following physical channels may be specified for UL/DL and FDD mode:

PUSCH: Uplink physical channel, carries user and control data in uplink;

PUCCH: Uplink physical channel only, i.e. no logical and transport channels are mapped to this channel, carries the control information such as HARQ ACK/NACKs in response to downlink transmissions on PDSCH, scheduling requests and CQI reports;

PRACH: Uplink physical channel only, carries PRACH sequence;

PDSCH: Downlink physical channel, carries user and control data and paging messages in downlink, occupies the OFDMA symbols in a sub-frame not occupied by PDCCH;

PDCCH: Downlink physical channel only, i.e. no logical and transport channels are mapped to this channel, carries the control information related to DL/UL transmissions such as resource assignments and HARQ information, occupies 1, 2, 3 or 4 OFDMA symbols in the first slot in a sub-frame; the number of symbols is adjusted by network and signaled on PCFICH;

PCFICH: Downlink physical channel, informs the UE about the number of OFDMA symbols used for the PDCCHs, occupies the first OFDMA symbol in the first slot in a sub-frame, is transmitted when the number of OFDMA symbols for PDCCH is greater than zero;

PHICH: Downlink physical channel, carries Hybrid ARQ ACK/NACKs in response to uplink transmissions, occupies 1, 2, or 3 OFDMA symbols in the first slot in a sub-frame, the number of symbols is adjusted by network and signaled on PBCH; and PBCH: Carries system information to be broadcast in the cell such as DL bandwidth information and number of OFDMA symbols assigned to PHICH.

It is noted that exemplary specifications for physical channels are described in the standard 3GPP TS 36.211, in particular version V10.5.0 (2012-06) or higher.

A physical resource block (PRB) may be the baseline unit of resource allocation for physical channels defined in LTE. A physical resource block may include a matrix of sub carriers and OFDMA/SC-FDMA symbols. A pair of one OFDMA/SC-FDMA symbol and one sub carrier may be denoted as resource element. It is noted that an exemplary specification for a physical resource block is described in the standard 3GPP TS 36.211, in particular version V10.5.0 (2012-06) or higher.

A system information block may be used for broadcasting system information from the network to a transceiver. In LTE, a system information block may be used for broadcasting system information from the radio access network to User Equipments in a cell. The system information elements may be broadcast in system information blocks. A system information block may group together system information elements of the same nature. Different system information blocks may have different characteristics, e.g. regarding their repetition rate and the requirements on UEs to re-read the system information blocks.

The system information may be organized as a tree. A master information block may give references and scheduling information to a number of system information blocks in a cell. The system information blocks may contain the actual system information. The master information block may optionally also contain reference and scheduling information to one or two scheduling blocks which give references and scheduling information for additional system information blocks. Scheduling information for a system information block may only be included in either the master information block or one of the scheduling blocks.

It is noted that an exemplary specification for a system information block is described in the standard 3GPP TS 36.331, in particular version V11.0.0 (2012-06) or higher.

The methods and devices described herein may be implemented in wireless and wire-line communication, in particular communications transported by communication networks according to an LTE, OFDM or DSL standard. The methods and devices described below may further be implemented in a base station (or NodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The described methods and devices may be designed for implementing and extending an OFDM-based standard defining a transmission via OFDM. Implementing the standard means that standard compliant devices may be interoperable with the methods and devices described herein. Extending the standard means that methods and devices described herein may improve the standard by providing additional features and functionality.

OFDM is a method of encoding digital data on multiple carrier frequencies. OFDM has developed into a popular scheme for wideband digital communication, whether wireless or over copper wires, used in applications such as digital television and audio broadcasting, digital subscriber line (DSL) broadband internet access, wireless networks and 4G mobile communications.

OFDM is essentially corresponding to coded OFDM (COFDM) and discrete multi-tone modulation (DMT), and is a frequency-division multiplexing (FDM) scheme that may be used as a digital multi-carrier modulation method. A large number of closely spaced orthogonal sub-carrier signals may be used to carry data. The data may be divided into several parallel data streams or channels, one for each sub-carrier. Each sub-carrier may be modulated with a conventional modulation scheme such as quadrature amplitude modulation (QAM) or phase-shift keying (PSK) at a low symbol rate, thereby maintaining total data rates similar to conventional single-carrier modulation schemes in the same bandwidth.

In OFDM, a low symbol rate may make a use of a guard interval between symbols affordable, providing the possibility to eliminate intersymbol interference (ISI) and utilize echoes and time-spreading to achieve a diversity gain, i.e. a signal-to-noise ratio improvement. This mechanism may also facilitate a design of single frequency networks (SFNs) wherein several adjacent transmitters may send the same signal simultaneously at the same frequency, as the signals from multiple distant transmitters may be combined constructively, rather than interfering as would typically occur in a traditional single-carrier system.

It is noted that an exemplary specification for a signal generation using OFDM is described in the standard 3GPP TS 36.211, in particular version V10.5.0 (2012-06) or higher.

The methods and devices described herein after may be designed to implement and extend mobile standards such as the downlink and uplink of the 3GPP Long Term Evolution (LTE) fourth generation mobile broadband standard. The LTE radio interface was formerly named High Speed OFDM Packet Access (HSOPA), now named Evolved Universal Terrestrial Radio Access (E-UTRA).

The methods and devices described herein after may be designed to implement and extend mobile standards such as the wireless LAN (WLAN) radio interfaces IEEE 802.11a, g, n and HIPERLAN/2, the digital radio systems DAB/EUREKA 147, DAB+, Digital Radio Mondiale, HD Radio, T-DMB and ISDB-TSB, the terrestrial digital TV systems DVB-T and ISDB-T, the terrestrial mobile TV systems DVB-H, T-DMB, ISDB-T and MediaFLO forward link, the wireless personal area network (PAN) ultra-wideband (UWB) IEEE 802.15.3a implementation suggested by WiMedia Alliance. The methods and devices described herein may be designed to be used in several 4G and pre-4G cellular networks and mobile broadband standards such as the mobility mode of the wireless MAN/broadband wireless access (BWA) standard IEEE 802.16e (or Mobile-WiMAX) and the mobile broadband wireless access (MBWA) standard IEEE 802.20.

The methods and devices described herein may be designed to implement and extend cable or wired standards such as ADSL and VDSL broadband access via POTS copper wiring, DVB-C2, an enhanced version of the DVB-C digital cable TV standard, Power line communication (PLC), ITU-T G.hn, a standard which provides high-speed local area networking of existing home wiring (power lines, phone lines and coaxial cables), telephone line modems and Multimedia over Coax Alliance (MoCA) home networking.

FIG. 1 schematically illustrates a method 100 for operating a transceiver circuit in accordance with the disclosure. The method 100 for operating a transceiver circuit includes receiving an information indicating at least one of a transmission and a reception in a guard band region of a frequency band supported by a communications network at 101, and allocating at least a part of the guard band region of the supported frequency band of the communications network for at least one of a transmission and a reception of at least one physical channel at 103.

By using the guard band region, a transceiver circuit may provide improved data transmission and/or reception as additional bandwidth is allocated and used. Such transceiver circuit may be a standard compliant LTE transceiver circuit exploiting the additional functionality of transmitting/receiving in the guard band region. The transceiver circuit may solely transmit or solely receive or the transceiver circuit may both, transmit and receive in the guard band region.

The information indicating the transmission and/or reception in the guard band region may correspond to a system information block. A standard compliant LTE system information block may be used with the extended functionality of informing the transceiver of a supported transmission and/or reception in the guard band area.

The part of the guard band region may correspond to at least one physical resource block. For transmission/reception in the guard band region, the already existing standard compliant physical resource blocks may be used. Instead of transmitting/receiving the physical resource blocks in the supported frequency band, they may be transmitted/received in the guard band region at the edges of the supported frequency band. This may improve performance and increase network throughput.

The guard band region may be symmetrically arranged around a DC sub-carrier. By this arrangement, the guard band region may be considered as further sub-carriers symmetrically arranged around the DC sub-carrier, thereby facilitating implementation effort for implementing these further sub-carriers because the same already implemented algorithm, e.g. OFDM, may be used for implementing these further sub-carriers. A simple reconfiguration of the implemented algorithm may be required to enable the guard band region as additional sub-carriers.

The guard band region may be arranged at the edges of the supported frequency band. When the guard band region is located at the edges of the supported frequency band, an interference due to using the guard band for data transmission with sub-carriers located in the supported frequency band carrying data may be minimized.

A bandwidth of the guard band region may be smaller than a bandwidth of the supported frequency band. That is, the guard band region may be only a small portion of the whole supported frequency band, yet, it may be large enough to provide significant performance improvement when being used for additional transmission and reception. Exemplary Table 1 shows a size of the total guard band region and a number of physical resource blocks (PRBs) defined for each cell bandwidth size, e.g. for a conventional LTE communications system.

The additional PRBs in the guard band region may thus be transparent to, e.g. LTE, legacy UEs, i.e. they are not aware of these PRBs and are not used for the operation of legacy LTE UEs in the same frequency band.

TABLE 1

Size of total guard band region and number of PRBs defined for each cell bandwidth size for LTE

| Cell bandwidth [MHz] | Number of PRBs | Total guard band region size |
| --- | --- | --- |
| 1.4 | 6 | 320 kHz |
| 3 | 15 | 300 kHz |
| 5 | 25 | 500 kHz |
| 10 | 50 | 1 MHz |
| 15 | 75 | 1.5 MHz |
| 20 | 100 | 2 MHz |

The method 100 may further include at least one of transmitting and receiving the at least one physical channel in the guard band region by using the allocated at least one physical resource block (PRB). When the allocated PRB is used for at least one of transmission and reception, the total number of PRBs defined in the cell may be increased, thereby increasing the throughput in the communications network.

The method may further include applying frequency-hopping over the at least one allocated physical resource blocks in the guard band region. Frequency-hopping is a method of transmitting signals, here physical resource blocks, by rapidly switching among many frequency channels, using a pseudorandom sequence known to both transmitter and receiver. Frequency hopping may offer the following advantages over fixed-frequency transmission: High resistance to narrowband interference. The process of re-collecting a physical resource block spreads out the interfering signal, causing it to recede into the background. Frequency hopping signals may be difficult to intercept. The signals simply may appear as an increase in the background noise to a narrow-band receiver. An eavesdropper may only be able to intercept the transmission if the pseudorandom sequence is known to him. Frequency hopped transmissions may share a frequency band with many types of conventional transmissions with minimal interference. The frequency hopped signals add minimal noise to the narrow-band communications, and vice versa. As a result, bandwidth may be utilized more efficiently.

The system information block may be received on sub-carriers of the supported frequency band which are not located in the guard band region. Sub-carriers of the supported frequency band that are not located in the guard band region may be used for transmission of the system information block. Thus, an initial transmission of the SIB or a transmission after a connection loss may be received by each standard compliant transceiver circuit while transceiver circuits implementing aspects in accordance with the disclosure may additionally receive information from the SIB which guard band region is supported for enhanced transmission/reception. Therefore, mechanisms of SIB transmission may not have to be changed.

The system information block may be received on sub-carriers centered around a DC sub-carrier. When the system information block is received on sub-carriers centered around a DC sub-carrier, low-band MTC UE devices supporting the lowest bandwidth size of e.g. 1.4 MHz in LTE may be able to detect and read the new SIB. Thus, implementation of the method 100 may be easy and requires no hardware changes in existing User Equipments.

The system information block may carry at least one of the following information: a location of available physical resource blocks in the guard band region, a number of available physical resource blocks in the guard band region, a size of a control channel region, a size of a data channel region, a supported sub-frame pattern, and a maximum allowed transmission power in the guard band region. Such information may enable the UE device or the MTC device to switch to the guard band region after acquisition of the new SIB information and to perform data transmission and reception in that area only.

In one example embodiment, the method 100 may further include restricting a transmission power for the transmission of the at least one physical channel according to a maximum allowed transmission power provided by the system information block. A reduction of transmission power may reduce interference to neighbor frequency bands. The reduction may be signaled to the transceiver circuit in accordance with the legacy procedures specified for LTE.

The method 100 may further include switching at least one of a transmission and a reception to exclusively the guard band region. By switching a transmission and/or reception to exclusively the guard band region, other data transmissions in the supported frequency band may not be affected, thereby implementing an additional transmission and/or reception in the guard band region may increase the transmission and/or reception bandwidth.

The switching to the guard band region may be performed upon receiving an overload indicator indicating an overload of the communications network. When the switching to the guard band region is performed upon receiving an overload indicator, an overload of the communications network may be reduced or avoided.

The method 100 may further include switching the at least one of the transmission and the reception back to sub-carriers carrying the system information block when at least one of the transmission and the reception in the guard band region is interrupted. This may enable low-end MTC devices and transceiver circuits to receive the SIB for a new connection setup as this initiating SIB is not carried in the guard band region.

The method 100 may further include performing at least one of a transmission and a reception on the supported frequency band and the guard band region. When both, the supported frequency band and the guard band region are used for transmission and/or reception, the data throughput may be increased and overload probability may be reduced.

The communications network may be at least one of a radio communications network, an OFDM-based communications network and an LTE communications network. The method 100 may be compliant for interoperation with a lot of different networks, e.g. wired networks and wireless networks and with a lot of different standards.

The transceiver circuit may be included in a User Equipment. In one example embodiment, the transceiver circuit may be included in a Machine-Type Communications device. The method 100 may be compliant for interoperation with different types of hardware devices, even with such hardware devices already installed in the field.

FIG. 2 schematically illustrates a configuration 200 of a frequency band supported by a communications network in accordance with the disclosure.

The supported frequency band 207 includes a number of sub-carriers 209 arranged around a DC sub-carrier 205. The supported frequency band 207 further includes a guard band region 201a, 201b arranged at channel edges 203a, 203b of the supported frequency band 207. An upper guard band region 201b is arranged at an upper channel edge 203b and a lower guard band region 201a is arranged at a lower channel edge 203a.

The supported sub-carriers may e.g. be generated according to an OFDM scheme.

The method 100 as described with respect to FIG. 1 may be applied to the supported frequency band configuration 200.

A low-cost, low-band MTC device in an LTE communication system may be operated by using the configuration 200 of the supported frequency band 207 as depicted in FIG. 2.

For cell bandwidths 207 of 10, 15 or 20 MHz a definite number of additional physical resource blocks (PRBs) of size 180 kHz may be used in the guard band area 201a, 201b of the cell bandwidth 207 for data transmission and reception.

For each scaleable bandwidth 207 of [1.4, 3, 5, 10, 15, 20] MHz in LTE systems, a narrow frequency range at the edges 203a, 203b of the frequency band 207 may be normally used as guard band (GB) 201a, 201b to ensure that transmission and/or reception in a specific frequency band does not interfere with transmission and/or reception in a neighbor frequency band. In FIG. 2, an example is depicted for the 3 MHz cell bandwidth where actually 15 PRBs (=2.7 MHz) are used for transmission and reception, and 300 kHz are unused as guard band for the purpose of preventing interference to neighbor frequency bands. In Table 1 (see above) with respect to FIG. 2, the size of total guard band region and number of PRBs as defined for each LTE bandwidth is summarized.

In particular for low-end (low cost, low data rate) applications for MTC, the guard band area 201a, 201b may be at least partly used and interference to neighbor frequency bands may be prevented, e.g. by restricting the TX power. Further, the additional PRBs in the guard band area 201a, 201b may be transparent to legacy LTE UEs, i.e. they may be not aware of these PRBs and may be not used for the operation of legacy LTE UEs in the same frequency band.

FIG. 3 schematically illustrates a further configuration 300 of a frequency band supported by a communications network in accordance with the disclosure. The configuration 300 may correspond to the configuration 200 described with respect to FIG. 2.

The supported frequency band 307 of 20 MHz as an exemplary cell bandwidth includes a number of sub-carriers 309 arranged around a DC sub-carrier 305. The supported frequency band 307 further includes a guard band region 301a, 301b arranged at channel edges 303a, 303b of the supported frequency band 307. An upper guard band region 301b is arranged at an upper channel edge 303b and a lower guard band region 301a is arranged at a lower channel edge 303a. The supported sub-carriers may e.g. be generated according to an OFDM scheme. The guard band region 301a, 301b may be partly used by additional PRBs 311a, 311b, e.g. for MTC devices. To prevent interference to neighbor frequency bands, a transmission power P2 315 of the sub-carriers allocated in the guard band region is reduced with respect to a transmission power P1 313 of the sub-carriers allocated outside the guard band that are used for normal transmission/reception.

The following exemplary configuration may be considered: An LTE network based on OFDMA/TDMA in downlink, SC-FDMA/TDMA in uplink, and operating in FDD mode. An LTE radio cell configured with a bandwidth size of 20 MHz in UL and DL. A low-cost, low-band MTC UE supporting only 1.4 MHz bandwidth size.

The LTE radio cell may support the operation of low-cost, low-band MTC devices in the guard band areas of its frequency bands in UL and DL, and the following exemplary parameters may be signaled on the new SIB which may be transmitted in frequency-domain on the 72 subcarriers (=6 PRBs) around the DC subcarrier:
(I) A location and a number of the available PRBs in the guard band area (upper and/or lower part): (1) DL: Frequency number; 1 PRB in upper part and (2) UL: Frequency number; 1 PRB in upper part;
(II) Size of the control channel region and PDSCH region in DL: (1) Control channel region: 2 OFDMA symbols and (2) PDSCH region: 12 OFDMA symbols;
(III) Physical channel sub-frame pattern for UL: Configuration 1 according to FIG. 7;
(IV) Maximum allowed TX power in dBm for transmission in the guard band area: P2=20 dBm.

Referring to FIG. 3, the exemplary configuration may apply the guard band area 301b in DL including 1 PRB in upper part 301b. The same configuration may also apply in UL.

After acquisition of the parameters signaled on the new SIB the MTC device may decide to switch to the upper part 301b of the guard band area in UL/DL and may perform transmission and reception of data there with reduced TX power P2 as signaled. The transmission and reception of physical channels in the guard band area 301b may be performed in accordance with the legacy procedures as specified in e.g. LTE.

Figure 4:
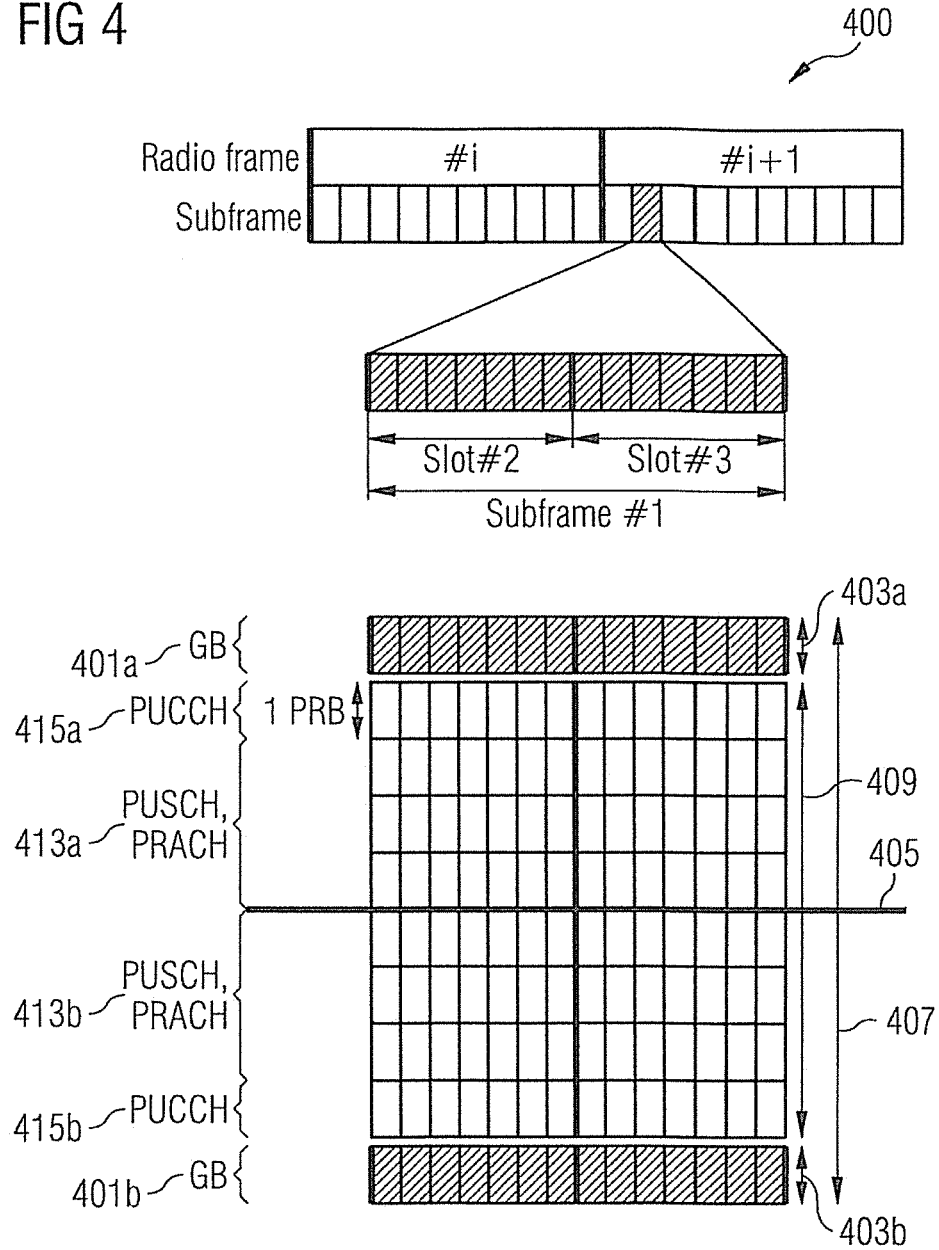
FIG. 4 schematically illustrates a configuration 400 of an LTE radio frame in accordance with the disclosure.

FIG. 4 schematically illustrates a configuration 400 of an, e.g. LTE, radio frame in accordance with the disclosure. The radio frame has a frame structure as described with respect to FIG. 13. However, the configuration of the slots in the frame is different as the guard band region is added for transmission.

The supported frequency band 407 includes a number of sub-carriers 409 arranged around a DC sub-carrier 405. The supported frequency band 407 further includes a guard band region 401a, 401b arranged at channel edges 403a, 403b of the supported frequency band 407. An upper guard band region 401b is arranged at an upper channel edge 403b and a lower guard band region 401a is arranged at a lower channel edge 403a. The supported sub-carriers may be generated according to an OFDM scheme. The guard band region 401a, 401b may be partly used by additional PRBs, one PRB using the upper guard band region 401b and one PRB using the lower guard band region 401a.

The transmission of the UL physical channels (e.g. PRACH, PUCCH, PUSCH) for the FDD mode may be organized as follows: The supported UL bandwidth 409 outside the guard band region may be separated into three parts. Two parts at spectrum edges may be used for PUCCH whose size is variable depending on PUCCH's capacity requirements and the remaining part is used for PUSCH and PRACH.

In FIG. 4, an example is depicted where 2 PRBs are assigned for guard band transmission, 2 PRBs are assigned for PUCCH, and the remaining 6 PRBs are assigned for PUSCH and PRACH transmission. The configuration 400 may correspond to the configuration 300 as described with respect to FIG. 3 or to the configuration 200 as described with respect to FIG. 2.

Figure 5:
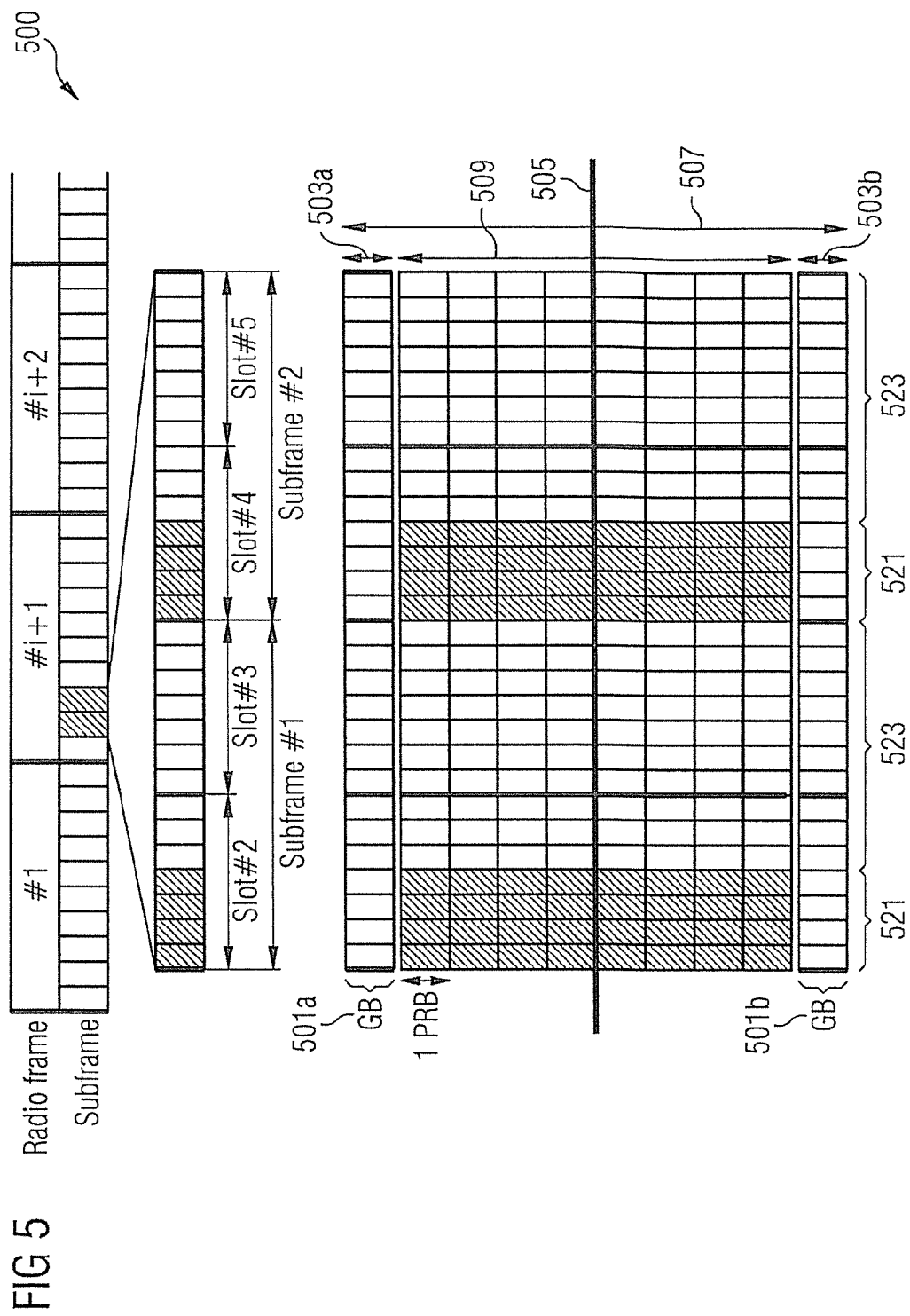
FIG. 5 schematically illustrates a further configuration 500 of an LTE radio frame in accordance with the disclosure.

FIG. 5 schematically illustrates a further configuration 500 of an, e.g. LTE, radio frame in accordance with the disclosure. The radio frame has a frame structure as described with respect to FIG. 13. However, the configuration of the slots in the frame is different as the guard band region is added for transmission.

The supported frequency band 507 includes a number of sub-carriers 509 arranged around a DC sub-carrier 505. The supported frequency band 507 further includes a guard band region 501a, 501b arranged at channel edges 503a, 503b of the supported frequency band 507. An upper guard band region 501b is arranged at an upper channel edge 503b and a lower guard band region 501a is arranged at a lower channel edge 503a. The supported sub-carriers may be generated according to an OFDM scheme. The guard band region 501a, 501b may be partly used by additional PRBs, one PRB using the upper guard band region 501b and one PRB using the lower guard band region 501a.

In this configuration the guard band region may be exploited by two additional PRBs, one at the upper guard band region 501b and one at the lower guard band region 501a. In other possible configurations the guard band region may be used by another number of PRBs, e.g. 4, 6, 8, 10, etc. In other possible configurations only one guard band region, the upper one 501b or the lower one 501a may be used by an exemplary number of 1, 2, 3, 4, 5, etc. PRBs. In other possible configurations the lower guard band region 501a may be used by a different number of PRBs than the upper guard band region 501b, for example 1 PRB in the lower guard band region 501a and 2 PRBs in the upper guard band region 501b.

A physical resource block (PRB) can be seen as a baseline unit of resource allocation for the physical channels defined in e.g. LTE. The physical resource block (PRB) may be of size 180 kHz. A physical resource block may include a matrix of 12 sub-carriers by 6 or 7 OFDMA/SC-FDMA symbols. A pair of one OFDMA/SC-FDMA symbol and one sub-carrier may be denoted as resource element.

The transmission of the DL control channels (PCFICH, PHICH, PDCCH) and the PDSCH for the FDD mode may be organized as follows: A sub-frame of length 1 ms may be separated into a control channel region 521 occupying a definite number of OFDMA symbols (up to 4 OFDMA symbols) and a PDSCH region 523 occupying the remaining OFDMA symbols. The length of the control channel region 521 and PDSCH region 523 may be configurable by the network. In the corresponding regions the DL control channels and PDSCH may be mapped to resource elements (RE) in the frequency-domain which may correspond to a pair of one OFDMA symbol and one sub-carrier. In FIG. 5, an example is depicted with a control channel region length of 4 OFDMA symbols and a PDSCH region length of 10 OFDMA symbols.

The guard band region 501a, 501b within the control channel region 521 and PDSCH region 523 may be configurable by the network for other applications.

It is noted that a new System Information Block (SIB) may be used to carry cell-specific information whether low-band MTC devices are supported and how data transmission and reception in the guard band area 501a, 501b is performed.

Such new SIB may be transmitted in the frequency-domain on the 72 sub-carriers 509 (=6 PRBs) around the DC sub-carrier 505. This may ensure that a low-band MTC UE supporting the lowest bandwidth size of 1.4 MHz is able to detect and read the new SIB. Such new SIB may be transmitted in the PDSCH region 523 and a PDCCH transmitted in the control channel region 521 may point to that new SIB in the PDSCH region 523.

Figure 7:
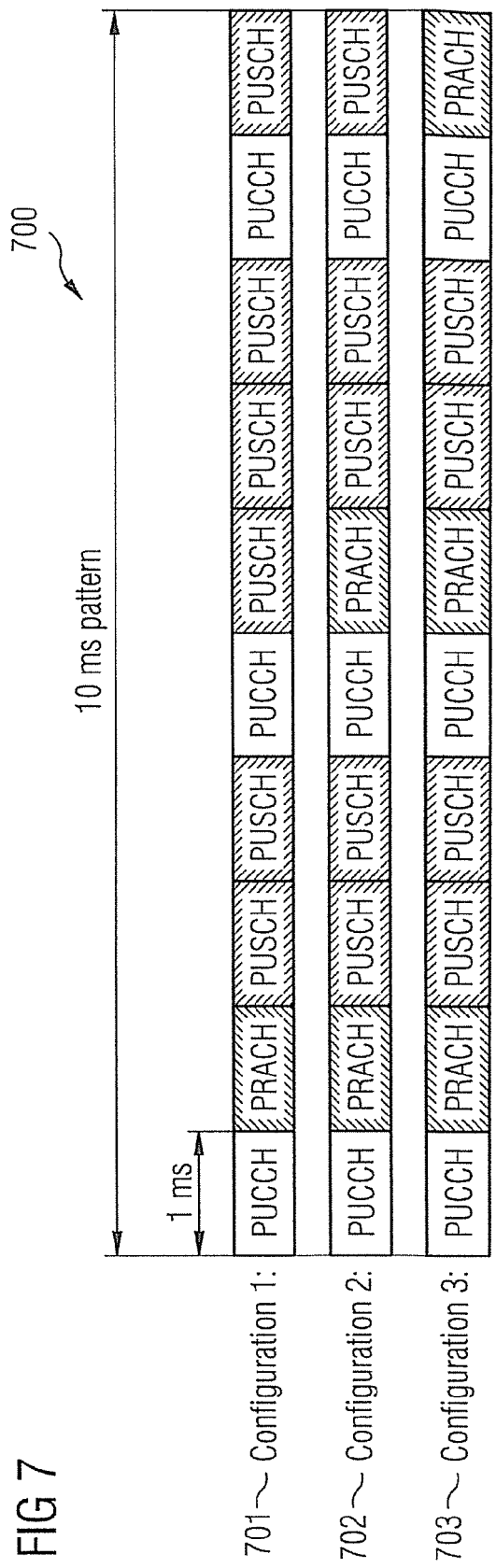
FIG. 7 schematically illustrates a frame structure 700 for three exemplary configurations 701, 702, 703 of an LTE radio frame in accordance with the disclosure.

Such new SIB may carry the following parameters:

A location and a number of the available PRBs in the guard band area (upper and/or lower part). For FDD this information may be provided specifically for UL and DL;

Size of the control channel region and PDSCH region in DL;

For FDD: Physical channel sub-frame pattern for UL. A sub-frame pattern may indicate which sub-frames are allocated for the transmission of a specific UL physical channel. In FIG. 7 exemplary physical channel sub-frame patterns of length 10 ms are depicted; and Maximum allowed TX power in dBm for transmission in the guard band area.

The MTC device may particularly read the new SIB in the cases when the radio cell has been initially selected by the MTC device to camp on or when an established call in the guard band area drops.

After acquisition of the new SIB information, the MTC device may switch to the guard band area 501a, 501b (either upper 501b or lower 501a part) and may perform a data transmission and reception in that area only. Alternatively, after acquisition of the new SIB information, the MTC device or the UE device may perform a data transmission and reception in the entire supported frequency band 507 including the guard band region 501a, 501b. By transmitting in the entire frequency band 507, data transmission for UEs supporting that kind of transmission may be improved while operation of UEs not supporting that kind of transmission may remain unchanged.

It is noted that the configuration 500 may correspond to the configuration 300 as described with respect to FIG. 3 or to the configuration 200 as described with respect to FIG. 2.

Figure 6:
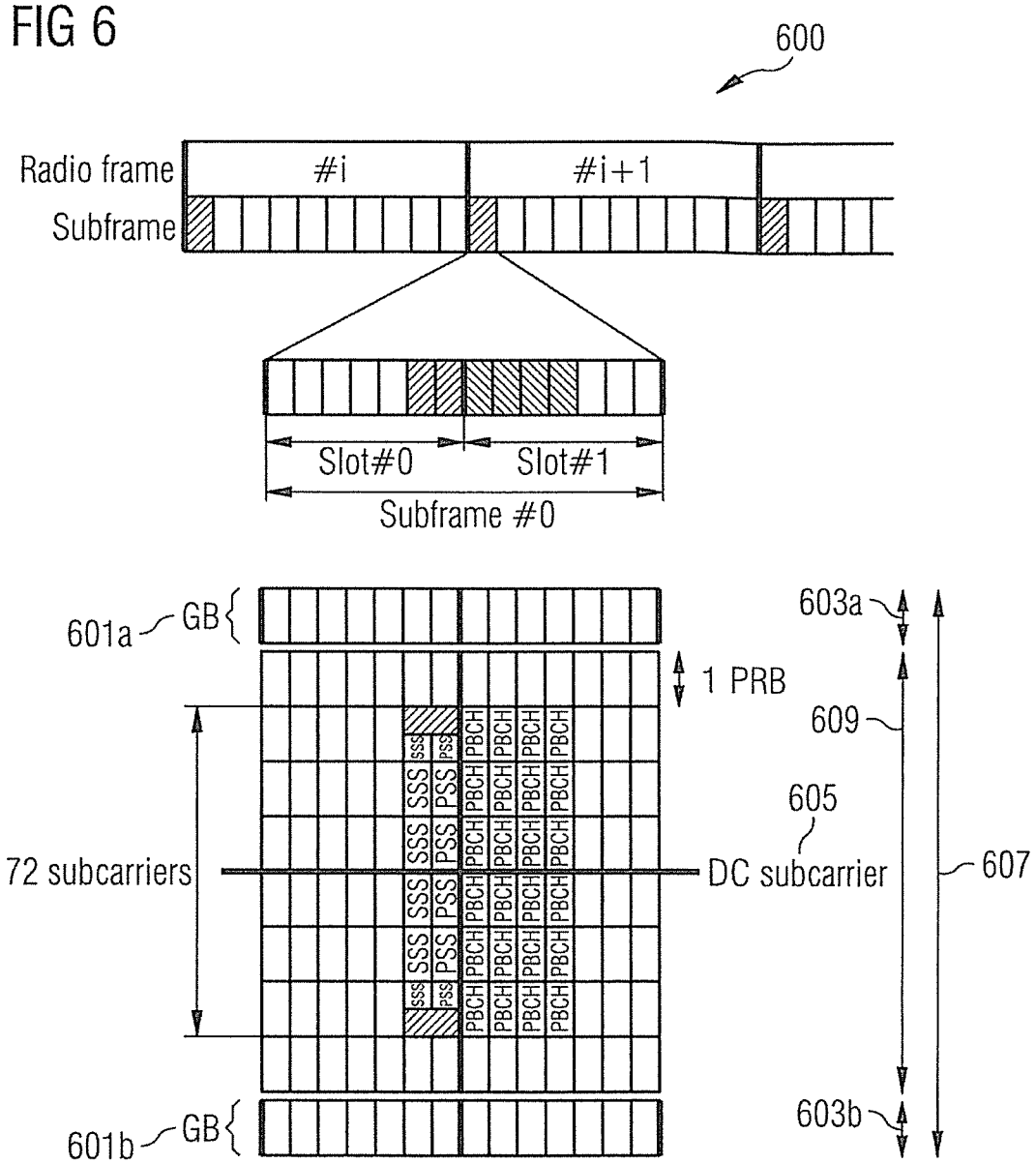
FIG. 6 schematically illustrates a further configuration 600 of an LTE radio frame in accordance with the disclosure.

FIG. 6 schematically illustrates a further configuration 600 of an, e.g. LTE, radio frame in accordance with the disclosure. The radio frame has a frame structure as described with respect to FIG. 13. However, the configuration of the slots in the frame is different as the guard band region is added for transmission.

The supported frequency band 607 includes a number of sub-carriers 609 arranged around a DC sub-carrier 605. The supported frequency band 607 further includes a guard band region 601a, 601b arranged at channel edges 603a, 603b of the supported frequency band 607. An upper guard band region 601b is arranged at an upper channel edge 603b and a lower guard band region 601a is arranged at a lower channel edge 603a. The supported sub-carriers may e.g. be generated according to an OFDM scheme. The guard band region 601a, 601b may be partly used by additional PRBs, one PRB using the upper guard band region 601b and one PRB using the lower guard band region 601a.

In FIG. 6, the time and frequency position of PSS (Primary Synchronization Signal), SSS (Secondary Synchronization Signal) and PBCH (Physical Broadcast Channel) is depicted. With respect to cell search, i.e. synchronization to and identification of an LTE radio cell, these physical signals and physical channel may be relevant. The DC sub-carrier 605 is the sub-carrier around the carrier frequency.

The PSS and SSS may be used to acquire slot and frame timing of a cell, and to determine the physical layer cell identity. The PSS and SSS may be mapped in the frequency-domain to 62 sub-carriers around the DC (Direct Current) subcarrier 605 and in the time-domain to the last/2nd last OFDMA symbol in slots 0 and 10 in each radio frame.

The PBCH may be used to signal cell-specific physical layer information such as DL bandwidth size and system frame number (SFN). The PBCH may be mapped in the frequency-domain to 72 subcarriers (=6 PRBs) around the DC subcarrier and in the time-domain to the first 4 OFDMA symbols in slot 1 in each radio frame.

It is noted that, in LTE, system and cell specific parameters may be broadcast to all UEs in a cell as system information using:

1. the Broadcast Control Channel (BCCH) logical channel, which is mapped on to the Broadcast Channel (BCH) transport channel and is physically sent on the Physical Broadcast Channel (PBCH) via the air interface;
2. the Broadcast Control Channel (BCCH) logical channel, which is mapped on to the Downlink Shared Channel (DL-SCH) transport channel and is physically sent on the Physical Downlink Shared Channel (PDSCH) via the air interface.

Overall, a large amount of system information may be transmitted to all UEs located in the radio cell. According to the nature of the information, the information may be grouped into various blocks, also referred to as SIBs as described above.

It is noted that the configuration 600 may correspond to the configuration 300 as described with respect to FIG. 3 or to the configuration 200 as described with respect to FIG. 2.

FIG. 7 schematically illustrates a frame structure 700 for three exemplary configurations 701, 702, 703 of e.g. an LTE radio frame in accordance with the disclosure. The frame structure 700 is according to the frame structure 1300 as described with respect to FIG. 13.

The configurations 701, 702, 703 show exemplary configurations for transporting uplink physical channels (e.g. PUCCH, PUCCH, PRACH) by using the guard band region as described with respect to FIG. 2 and FIG. 3.

It is noted that the configuration 700 may correspond to the configuration 300 as described with respect to FIG. 3 or to the configuration 200 as described with respect to FIG. 2.

Figure 8:
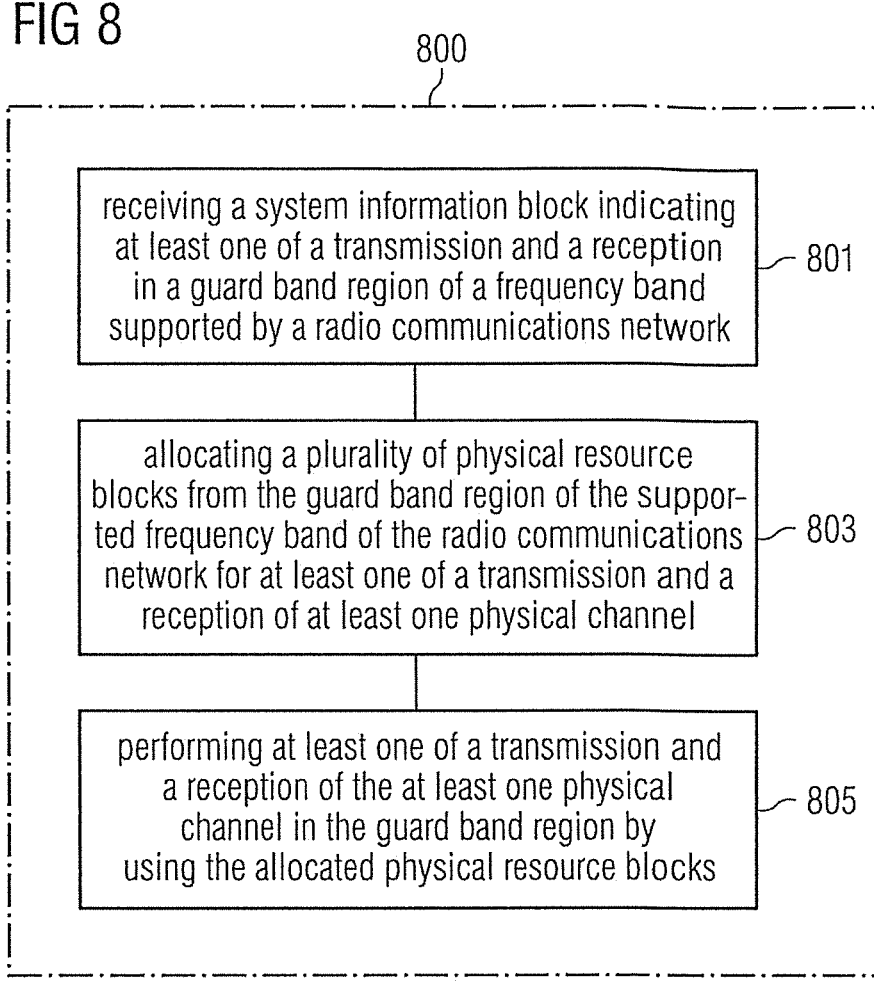
FIG. 8 schematically illustrates a method 800 for operating a transceiver circuit in accordance with the disclosure.

FIG. 8 schematically illustrates a method 800 for operating a transceiver circuit in accordance with the disclosure. The method 800 includes receiving a system information block indicating at least one of a transmission and a reception in a guard band region of a frequency band supported by a radio communications network at 801. The method 800 further includes allocating a plurality of physical resource blocks from the guard band region of the supported frequency band of the radio communications network for at least one of a transmission and a reception of at least one physical channel at 803. The method 800 further includes performing at least one of a transmission and a reception of the at least one physical channel in the guard band region by using the allocated physical resource blocks at 805.

The acts 801 of receiving and 803 of allocating may correspond to the acts 101 of receiving and 103 of allocating as described with respect to FIG. 1 in one example. The configuration of the guard band region may correspond to the configuration as described in the preceding figures.

The at least one physical channel may include one of the following: a Physical Uplink Shared Channel, a Physical Uplink Control Channel, a Physical Random Access Channel, a Physical Downlink Shared Channel, a Physical Downlink Control Channel, a Physical Control Format Indicator Channel, and a Physical Hybrid ARQ Indicator Channel.

The method may support at least one of the frequency bandwidths 1.4 MHz, 3 MHz, and 5 MHz. The radio communications network may support at least one of the frequency bandwidths 10 MHz, 15 MHz, and 20 MHz. Each of the physical resource blocks may have a size of 180 kHz. Each of the physical resource blocks may be partitioned as a matrix of 12 sub-carriers and 6 or 7 data symbols.

Figure 9:
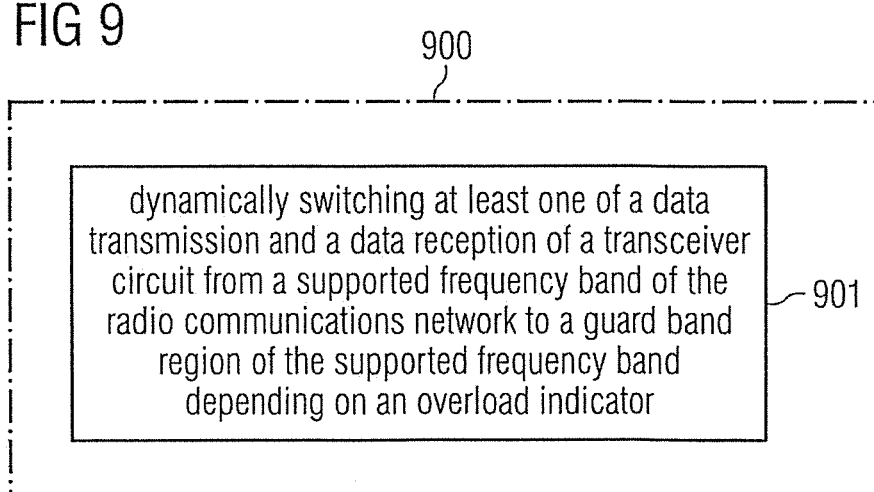
FIG. 9 schematically illustrates a method 900 for overload protection in a radio communications network in accordance with the disclosure.

FIG. 9 schematically illustrates a method 900 for overload protection in a radio communications network in accordance with the disclosure.

The method 900 includes dynamically switching at least one of a data transmission and a data reception of a transceiver circuit from a supported frequency band of the radio communications network to a guard band region of the supported frequency band depending on an overload indicator at 901. The guard band region may correspond to a guard band region as described with respect to FIG. 1 in one example. Act 901 of switching may include a switching to a configuration 200, 300, 400, 500, 600 as described with respect to FIGS. 2 to 6. The switching to the guard band region may be configurable depending on a type of User Equipment supported by the transceiver circuit.

Figure 10:
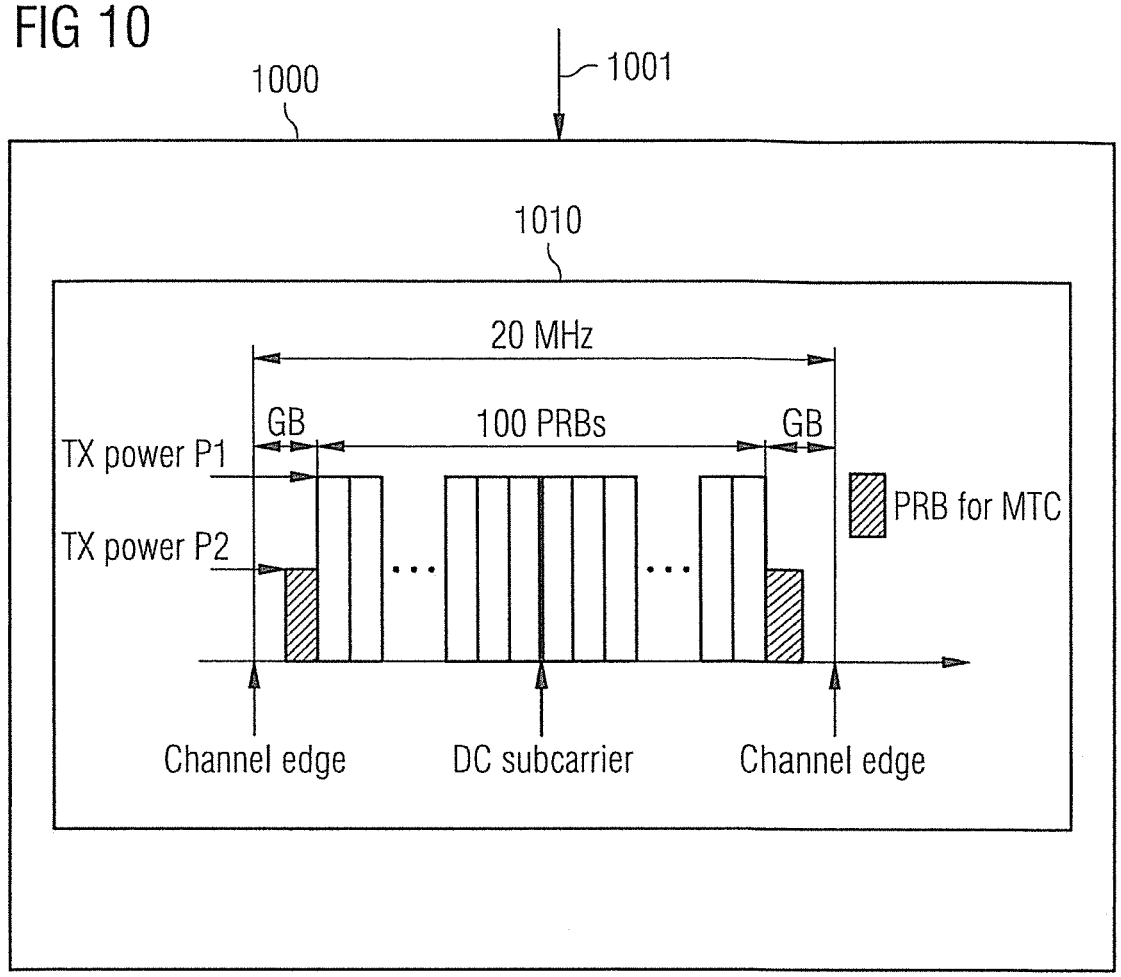
FIG. 10 illustrates a block diagram of a transceiver circuit 1000 in accordance with the disclosure.

FIG. 10 illustrates a block diagram of a transceiver circuit 1000 in accordance with the disclosure.

The transceiver circuit 1000 is configured to receive an information 1001 indicating at least one of a transmission and a reception in a guard band region of a frequency band supported by a communications network. The transceiver circuit 1000 includes a unit 1010 configured to allocate at least a part of the guard band region of the supported frequency band of the communications network for at least one of a transmission and a reception of at least one physical channel.

The unit 1010 may perform a method 100 as described with respect to FIG. 1. In an exemplary embodiment, the unit 1001 may be configured according to a configuration 200, 300, 400, 500, 600, 701, 702, 703 as described with respect to FIGS. 2 to 7.

Figure 11:
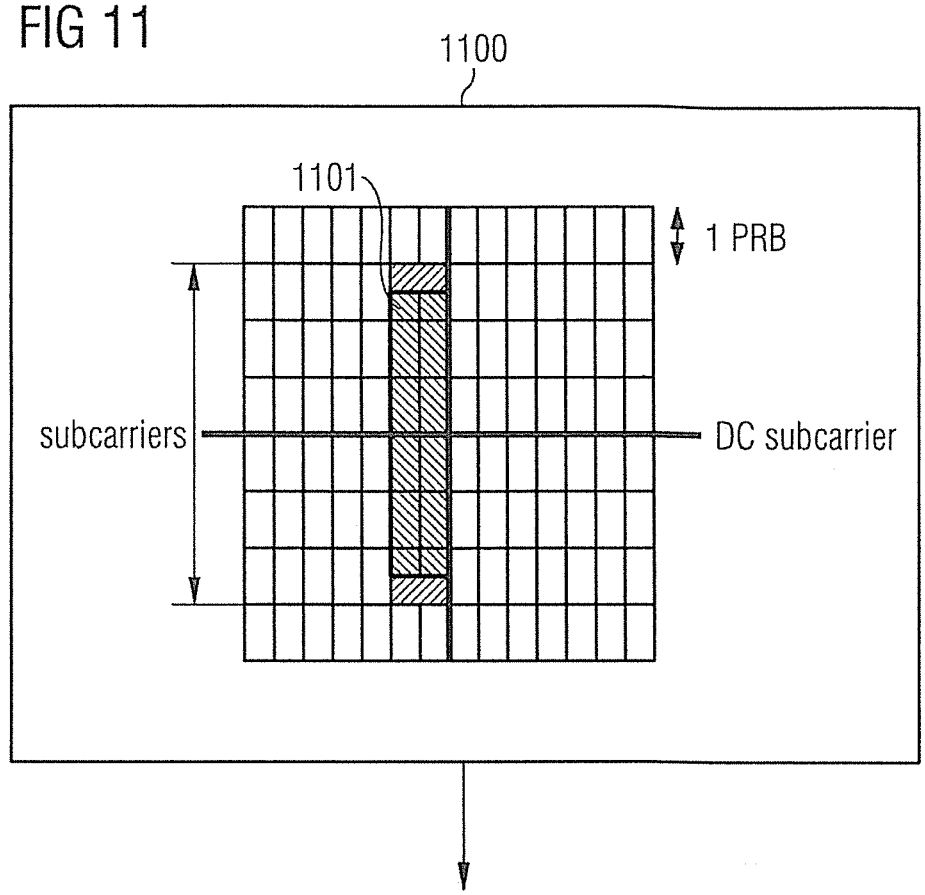
FIG. 11 illustrates a block diagram of a further transceiver circuit 1100 in accordance with the disclosure.

FIG. 11 illustrates a block diagram of a further transceiver circuit 1100 in accordance with the disclosure. The transceiver circuit 1100 is configured to transmit a system information block 1101 indicating at least one of a transmission and a reception in a guard band region of a frequency band supported by a communications network.

The transceiver circuit 1100 may perform a method 100 as described with respect to FIG. 1. In an exemplary embodiment, the transceiver circuit 1100 may be configured according to a configuration 200, 300, 400, 500, 600, 701, 702, 703 as described with respect to FIGS. 2 to 7.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein.

What is claimed is:

1. A method for operating a transceiver circuit, comprising:
receiving an information indicating at least one of a transmission and a reception in a guard band region of a frequency band supported by a communications network, wherein the information indicating the at least one of a transmission and a reception in the guard band region corresponds to a system information block;
allocating at least a part of the guard band region of the supported frequency band of the communications network for at least one of a transmission and a reception of at least one physical channel; and
restricting a transmission power for the transmission of the at least one physical channel according to a maximum allowed transmission power provided by the system information block.

2. The method of claim 1, wherein the part of the guard band region corresponds to at least one physical resource block.

3. The method of claim 2, further comprising:
performing at least one of a transmission and a reception of the at least one physical channel in the guard band region by using the allocated at least one physical resource block.

4. The method of claim 2, further comprising:
applying frequency-hopping over the at least one allocated physical resource blocks in the guard band region.

5. The method of claim 1, wherein the guard band region is symmetrically arranged around a DC sub-carrier of the supported frequency band.

6. The method of claim 1, wherein the guard band region is located at the edges of the supported frequency band.

7. The method of claim 1, wherein a bandwidth of the guard band region is smaller than a bandwidth of the supported frequency band.

8. The method of claim 1, wherein the system information block is received on sub-carriers of the supported frequency band outside the guard band region.

9. The method of claim 1, wherein the system information block is received on sub-carriers centered around a DC sub-carrier of the supported frequency band.

10. The method of claim 1, wherein the system information block carries at least one of the following information: a location of available physical resource blocks in the guard band region, a number of available physical resource blocks in the guard band region, a size of a control channel region, a size of a data channel region, a supported sub-frame pattern, and a maximum allowed transmission power in the guard band region.

11. The method of claim 1, further comprising:
switching at least one of a transmission and a reception to exclusively the allocated guard band region.

12. The method of claim 11, wherein the step of switching to the guard band region is performed upon receiving an overload indicator indicating an overload of the communications network.

13. The method of claim 11, further comprising:
switching the at least one of a transmission and a reception back to sub-carriers carrying the system information block when at least one of the transmission and the reception in the guard band region is interrupted.

14. The method of claim 1, further comprising:
performing at least one of a transmission and a reception on the supported frequency band and the guard band region.

15. The method of claim 1, wherein the communications network is at least one of a radio communications network, an OFDM-based communications network and an LTE communications network.

16. The method of claim 1, wherein the transceiver circuit is comprised in a User Equipment, in particular in a Machine-Type Communications device.

17. A method for operating a transceiver circuit, comprising:
receiving a system information block indicating at least one of a transmission and a reception in a guard band region of a frequency band supported by a radio communications network;
allocating a plurality of physical resource blocks from the guard band region of the supported frequency band of the radio communications network for at least one of a transmission and a reception of at least one physical channel, wherein a part of the guard band region corresponds to at least one physical resource block;
performing at least one of a transmission and a reception of the at least one physical channel in the guard band region by using the allocated physical resource blocks; and
applying frequency-hopping over the at least one allocated physical resource blocks in the guard band region.

18. The method of claim 17, wherein the at least one physical channel comprises one of the following: a Physical Uplink Shared Channel, a Physical Uplink Control Channel, a Physical Random Access Channel, a Physical Downlink Shared Channel, a Physical Downlink Control Channel, a Physical Control Format Indicator Channel, and a Physical Hybrid ARQ Indicator Channel.

19. The method of claim 17, wherein the transceiver circuit supports at least one of the frequency bandwidths 1.4 MHz, 3 MHz, and 5 MHz, wherein the radio communications network supports at least one of the frequency bandwidths 10 MHz, 15 MHz, and 20 MHz, and wherein each of the physical resource blocks has a size of 180 kHz and is partitioned as a matrix of 12 sub-carriers and 6 or 7 data symbols.

20. A method for overload protection in a radio communications network, comprising:
dynamically switching at least one of a data transmission and a data reception of a transceiver circuit from a supported frequency band of the radio communications network to exclusively an allocated guard band region of the supported frequency band depending on an overload indicator; and
switching the at least one of a transmission and a reception back to sub-carriers carrying the system information block when at least one of the transmission and the reception in the guard band region is interrupted.

21. The method of claim 20, wherein the switching to the guard band region is configurable depending on a type of User Equipment supported by the transceiver circuit.

22. A transceiver circuit configured to receive an information indicating at least one of a transmission and a reception in a guard band region of a frequency band supported by a communications network, the transceiver circuit comprising:
a first circuitry configured to allocate at least a part of the guard band region of the supported frequency band of the communications network for at least one of a transmission and a reception of at least one physical channel, wherein the part of the guard band region corresponds to at least one physical resource block; and
a second circuitry configured to apply frequency-hopping over the at least one allocated physical resource blocks in the guard band region.

23. A transceiver circuit, comprising:
a first circuitry configured to transmit a system information block indicating at least one of a transmission and a reception in a guard band region of a frequency band supported by a communications network; and
a second circuitry configured to receive the system information block and restrict a transmission power for transmission of at least one physical channel according to a maximum allowed transmission power provided by the system information block.

* * * * *